Figure 4:
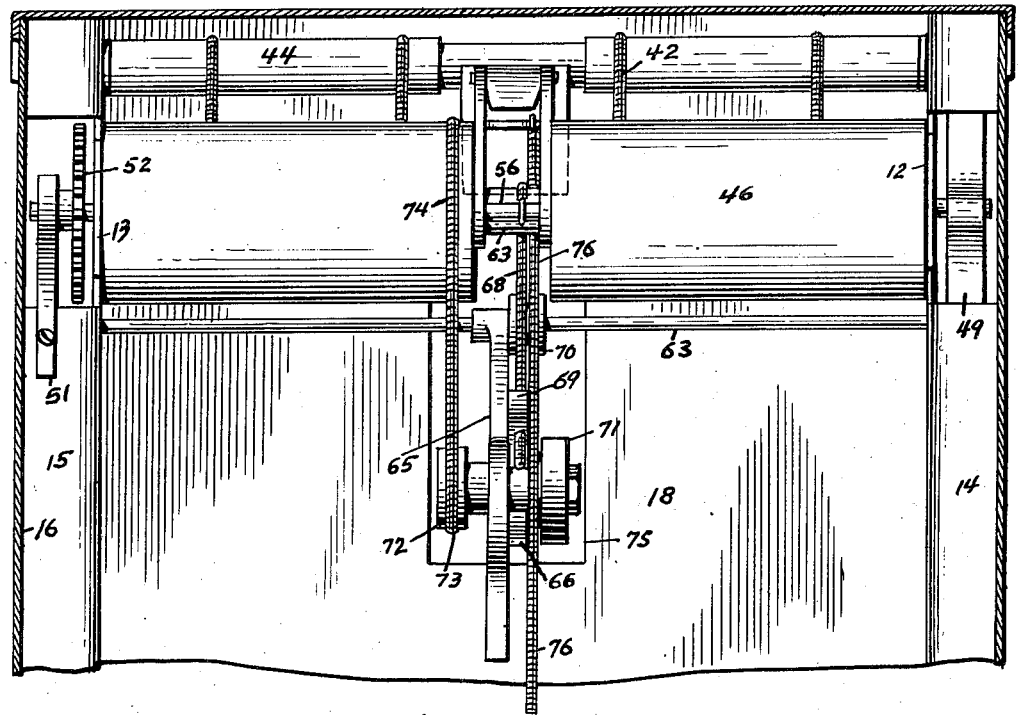

June 28, 1938. H. GODOY 2,122,250
DISPLAY DEVICE
Filed Oct. 2, 1936 3 Sheets-Sheet 1
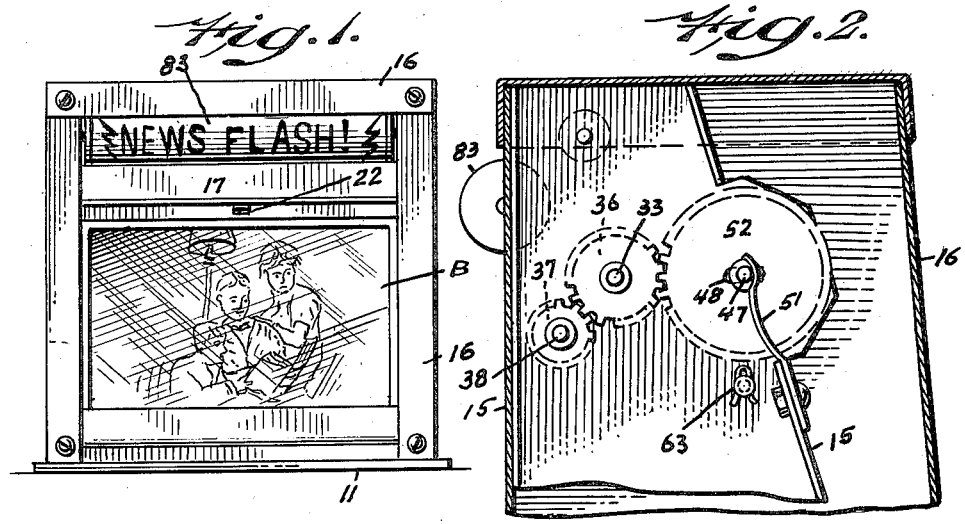
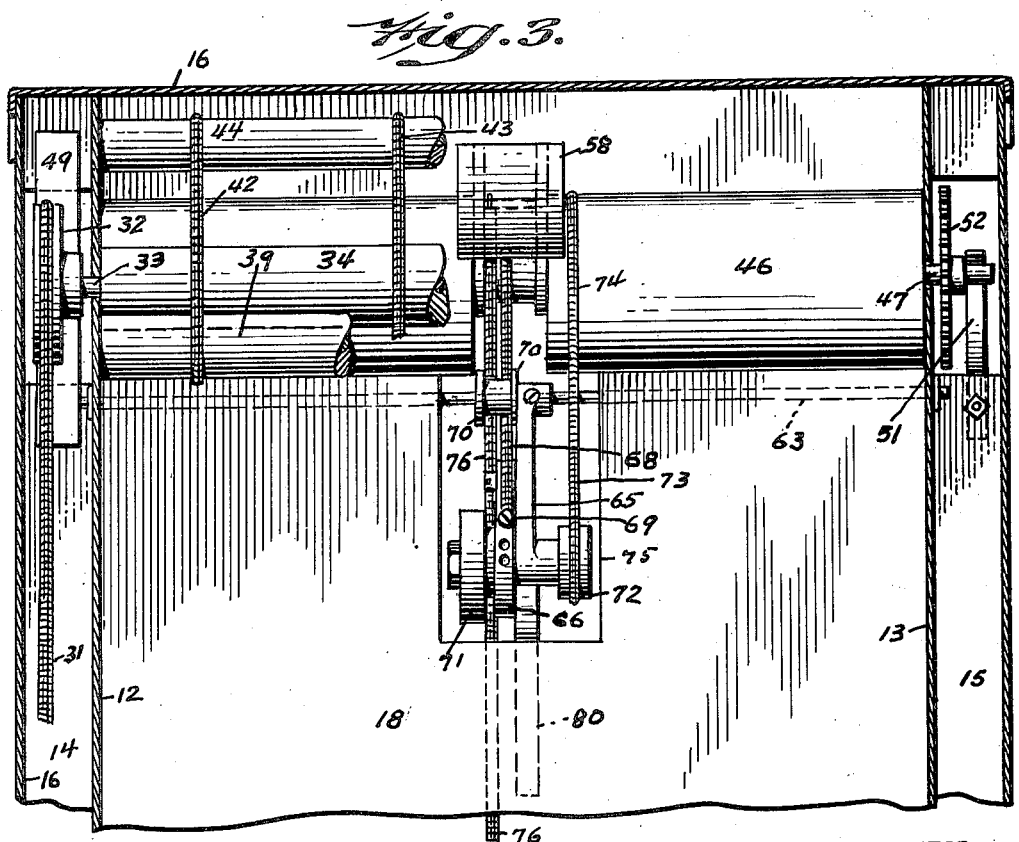
INVENTOR.
HUMBERT GODOY.
BY
ATTORNEY.

June 28, 1938.  H. GODOY  2,122,250
DISPLAY DEVICE
Filed Oct. 2, 1936  3 Sheets-Sheet 2

INVENTOR.
HUMBERT GODOY,
BY
ATTORNEY.

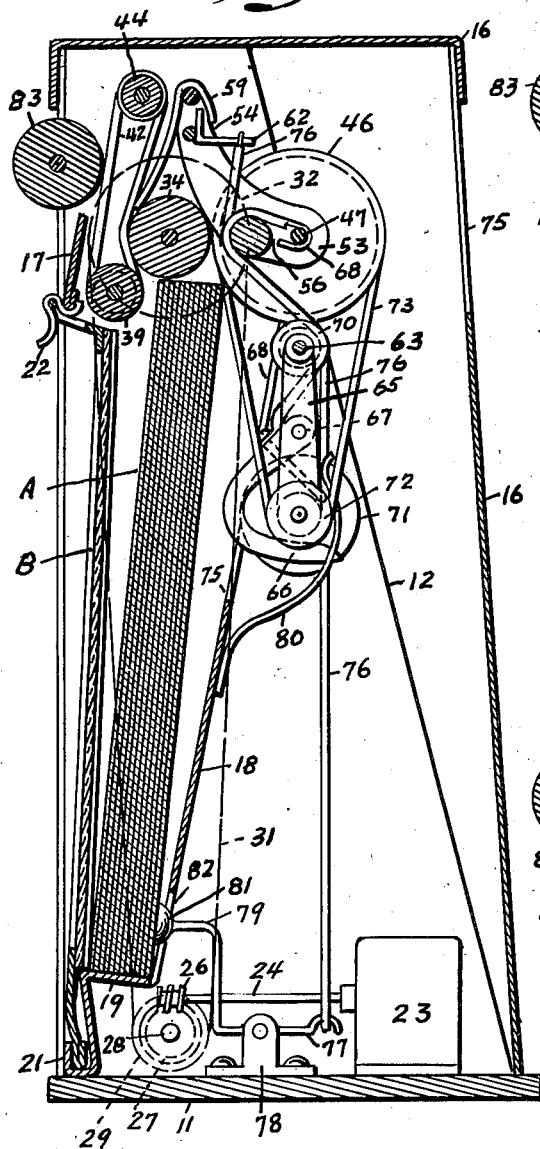
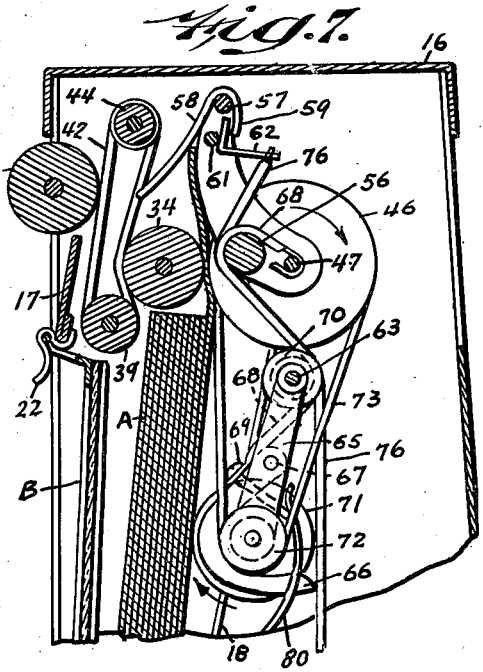
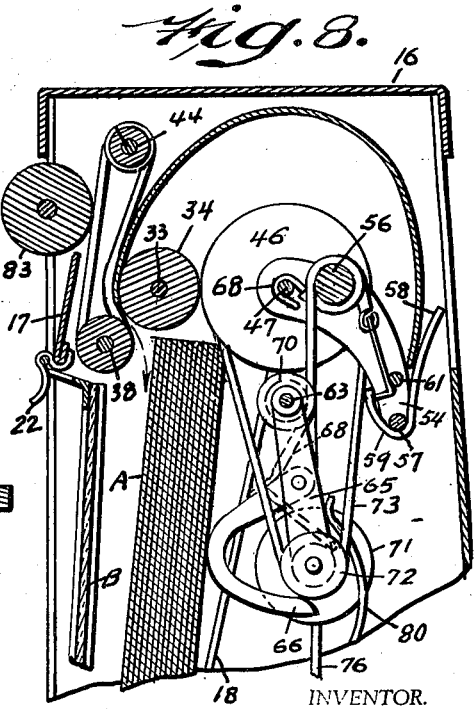

Patented June 28, 1938

2,122,250

UNITED STATES PATENT OFFICE 2,122,250

DISPLAY DEVICE

Humbert Godoy, Philadelphia, Pa.

Application October 2, 1936, Serial No. 103,706

31 Claims. (Cl. 40—36)

This invention relates to a display device, and particularly to a display device in which photographs, cards, prints, cuts, or the like are consecutively and continuously exhibited to view at the front of the device.

Many devices of the character of the invention herein described have been built and operated, but in many instances, the apparatus for exhibiting the displays have been more than twice the height of the said displays, and in many instances the devices themselves have contained complicated mechanism, which, when any of the parts failed to function, rendered the machine inoperative.

In the present device the machine is constructed in such a manner that the entire height of the same is less than one and one-half times the height of the displays exhibited, and the mechanism is simple, efficient and unlikely to become out of order to render the machine inoperative.

One of the objects of the invention is to provide a machine which will handle and successively exhibit all types of displays which will flex, and which will fall within the characterization of "non-flimsy".

Another object of the invention is to provide mechanism for successively and continuously exhibiting displays, and in which the entire casing, which holds the said displays and mechanism, will be but little higher than the height of the display itself.

A still further object of the invention is to provide a machine which will be practically noiseless in operation, and in which the display to be exhibited is lowered in front of the display previously exhibited.

Still another object of the invention is to provide means which will insure the handling of a single display at each operation of the machine.

According to the invention, the apparatus is mounted in a casing having a transparent panel at the front of the same, and behind which the displays are successively exhibited, a chamber for housing a plurality or group of displays, means for raising the rear display and for depositing the same in front of the group of displays, and immediately behind the transparent panel. The machine is provided with a friction roller which passes the rear display between rollers which in turn pass the upper end of the display into clutch mechanism, and which said clutch mechanism operates to prevent the display next to said rear display from being raised, while the movement of said raised display in said clutch member operates mechanism to disengage the friction roller from said display being raised, means for passing the lower end of said display, after the same has cleared said rollers between chained belts and rollers which direct said display into position in the front of said group of displays, and immediately behind the transparent panel.

The drawings illustrate an embodiment of the invention, and the views therein are as follows:—

Figure 5:
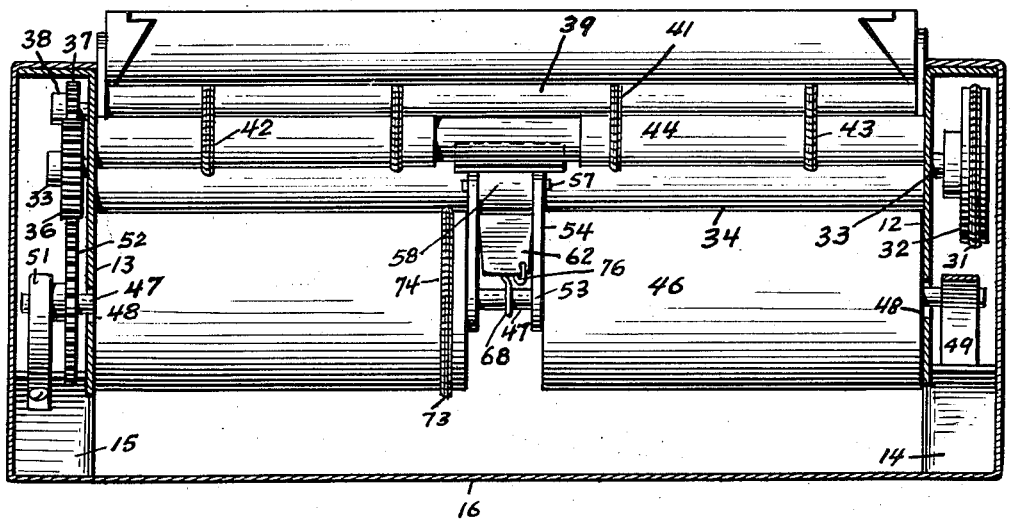

Figure 1 is a front elevation of the device,

Figure 2 is a fragmentary top vertical sectional view of one side of the casing with the outer panel removed, Figure 3 is a vertical sectional view showing the arrangement of the driving mechanism, Figure 4 is a rear view of the same, Figure 5 is a plan view thereof, Figure 6 is a vertical sectional view through the center of the machine, Figure 7 is a fragmentary central sectional view showing the upper part of the machine with the rear display partially raised, and Figure 8 is a like view showing the position of the mechanism when the lower end of the display has been raised for the purpose of lowering the same between the glass panel and group of displays in the chamber.

As illustrated in the drawings, the apparatus comprises a base 11 and a pair of inner side frames 12 and 13 (see Figure 2). These side walls are tapered downwardly (see Figure 6), and provided with outwardly extending flanges 14 and 15 which extend from top to bottom of said walls, while the sides and back of said apparatus are enclosed in a casing 16. At a position near the upper end of the front of the machine is a plate 17 which extends between and is securely fastened to the side frames 12 and 13. A metal plate 18 extends between the side frames 12 and 13 and to a height almost coincident with the top of the group of displays A. This plate is tapered (see Figure 6), and is bent to provide an oblique resting place 19 for the display group from which point the plate is bent downward and provides a channel 21 which accommodates the bottom of the framed transparent panel B, said frame having on its upper end latch means 22 for engaging the bottom of the plate 17 for retaining the glass panel B and its frame in position.

Referring now to Figure 6, the machine is operated by any suitable source of power, such as the motor 23, whose shaft 24 has a worm 26 connecting a worm gear 27. The motor 23 is mounted on the base 11 at a suitable point between the side frames 12 and 13, and the shaft 28, on which said worm gear is mounted, extends through the side frame 12 and is provided on its outer end with a pulley 29 over which a spring belt 31 passes and extends to and over a pulley 32 on a shaft 33, which said shaft is housed in the side frames 12 and 13, has a roller 34 extending between said frames, and is provided at its other end with a pinion 36 (see Figure 5).

Still referring to Figure 5 the pinion 36 meshes with a pinion 37 on a shaft 38, which said shaft extends through the side frames 12 and 13, and said shaft is provided with a roller 39 which has grooves 41 therein for receiving spring belts 42 which engage like grooves 43 on an idle roll 44 mounted above the same (see Figure 6).

The roller 34 bears against the spring belts 42, as shown in Figures 6, 7 and 8, while said roller 34 also bears against a large split roller 46 having a shaft 47 which extends through elongated slots 48 in the side frames 12 and 13, while spring members 49 and 51 tend to push said shaft toward the front of said slots and toward the front of said machine. This shaft is provided with a gear 52 which meshes with the pinion 36. The large roller 46 is split at its center, and a casting 53 is freely mounted on the shaft 47. This casting consists of side wings 54 having a circular post 56 between said wings. A shaft 57 is pivotally mounted in said wings and is provided with a clutch member 58 which has a downwardly extending apron 59. Below the shaft 57 is another pivotally mounted shaft 61 provided with a trigger 62.

Extending between the side frames 12 and 13 is a shaft 63 from which a pivotally mounted arm 65 depends, and which said arm has a finger 66 pivotally mounted thereon at 67, and a spring 68 is attached to said arm at 69 passed around the sheave 70 and around the post 56, and its end bent around the shaft 47, as shown in Figures 6, 7 and 8. The arm 65 has a shaft at its lower end, and extending therethrough and on one end there is mounted a friction roller 71, while its other end is provided with a sheave 72.

The arm 65 and attendant mechanism is pivotally operated on the shaft 63 through an aperture 75 in the metal plate 18, and a spring 80 affixed to said plate (see Figure 6) prevents the arm from passing outward beyond the dead center position shown in Figure 6, as later explained.

The sheave 72 has a spring belt 73 passing thereover and in a groove 74 on one part of the large roller 46.

The outer end of the trigger 62 has one end of a spring 76 attached thereto, and said spring extends down around the circular post 56 on the casting 53, and thence over the sheave 70, thence extends downward, and its other end connects one end of a rocker arm 77. This rocker arm is pivoted in a support 78, and its other arm 79 is provided at its outer end with a snubbing member 81 which said member operates through the aperture 82 in the metal plate 18, near the bottom of the display chamber. A display roller 83 may be rotatably mounted between the side frames 12 and 13 in such a manner that it may bear against the spring belts 42 and rotate the same when the machine is in operation.

The operation of the display device is as follows:—Let us assume that a group of display cards A has been placed in the display chamber resting on the oblique member 19. The machine is ready for operation. The displays have been placed in position by raising the latch means 22 in order to withdraw the frame and transparent panel B and replacing the same after the displays are in position. Upon current being supplied to the motor 23 (see Figure 6) the shaft 24 is rotated and the worm 26 rotates the worm wheel 27 which in turn rotates the pulley 29 on the shaft 28 which, by virtue of the belt 31, causes the rotation of the pulley 32 on the end of the shaft 33 carrying the roller 34. Gears 37 and 52 will operate the roll 39 and rolls 46, while the spring belts 42 will operate the roll 44.

As the roller 46 operates, it pulls the arm 65 forward from the dead center position of Figure 6 to a position, such as shown in Figure 7 where the friction wheel 71 contacts against the outer surface of the rear display and commences to raise the same upward between the rollers 46 and 34, so that its upper end is directed against the clutch 58, as shown in Figure 7. When the said display strikes the clutch, it forces the side wings 54 on which they are pivoted, and therefore, by virtue of the circular post 56, the tension is placed on the spring 68, so that the finger 66 is rotated on its pivot 67 so that it will engage the rear display and force the lower end of the arm 65 carrying the friction wheel 71 and sheave 72 away from the group of displays while the bight of the rollers 34 and 46 will continue to raise the rear display even though the friction wheel 71 has been disengaged. The spring 80 will prevent the arm 65 from passing outward across the dead center line between the shafts 47 and 63 and the pivot on which the sheave 72 is mounted.

When the side wings 54 of the casting 53 start to rotate, tension will be placed on the spring 76 attached to the trigger 62, so that said spring will draw the vertical part of said trigger against the apron 59 of the clutch 58 and lock the upper end of the raised display in said clutch while the tension on said spring 76 will also raise the outer end of the rocker arm 77 which will in turn press the snubbing member 81 against the display next to the rear one, and will therefore prevent the said display from being carried along with the rear display by friction or statical electricity.

The rollers 34 and 46 continue to raise the display until its lower end passes from between the same whereupon the said lower end will snap against the spring belts 42 extending between the rollers 39 and 44, and said belts will pull the lower end of said display downward between said belts and the roller 34 and will direct the bottom of said display against the face of the front display, and said contact of the belts 42 and roller 34 will continue to lower the said display until it is in full view behind the transparent panel of the device.

It will be noticed that the displays are slightly inclined from vertical, and their height is such that there will always be a portion of the top of the front display extending above the center of the roller 39. This insures the passing of the lower end of the elevated display down against and in front of the face of the front display. Figure 8 shows the condition of the apparatus at the time the elevated display has just been snapped from between the rollers 36 and 44, and drawn between the rollers 34 and belts 42, and the arrow shows the course which the bottom of said display will take. In this position, and as the elevated display is continued to be fed downward by its location between the rollers 34 and belts 42, the casting 54 will be drawn back to its original position because the clutch member 58 is still closed, tension being continuously placed thereon by virtue of the spring 76. Therefore, the casting is returned to its original position and the friction roller 71 will be again directed against the rear display for the elevation of said display through the procedure just described.

The split roller 46 has its shaft 47 mounted in the slots 48 and the springs 49 and 51 urging the said roller forward, so that said roller will always have a spring engagement with the roller 34 and will allow for displays of various thickness to pass between said rollers and sufficient tension be exerted thereon to raise the same to operate the casting 54.

It will readily be seen that the mechanism employed for consecutively and continuously exhibiting the displays is of the simplest nature and that there is practically no opportunity for the same to become impaired and to fail in operation.

Of course, an ordinary machine will accommodate any place from about three to fifty displays of photograph thickness, but it can be readily seen that the chamber, wherein is contained the group of exhibits A, can be of any dimension desired, so that the machine has no limit in the number of displays which may be consecutively exhibited.

The machine is capable of handling exhibits of the stiffness of heavy cardboard, Bristol board, photographs, and in fact all material of less stiffness, which is capable of making and sustaining the loop shown at X in Figure 8.

Of course the display apparatus herein illustrated and described may be modified and changed in various ways without departing from the invention herein set forth and hereafter claimed.

The invention is hereby claimed as follows:—

1. A display device for successively and continuously exhibiting a group of display cards or the like, comprising a casing having a chamber for the cards, means for elevating the rear card and for curving the same toward the back of the casing until its lower end has cleared the card group, means for reversing the movement of said card, and means for guiding said card into said chamber and at the front of said card group.

2. A display device for successively and continuously exhibiting a group of display cards or the like, comprising a casing having a chamber for the cards, roller and clutch means for elevating the rear card and for curving the same toward the back of the casing until its lower end has cleared the card group, means for reversing the movement of said card, and means for guiding said card into said chamber and at the front of said card group.

3. A display device for successively and continuously exhibiting a group of display cards or the like, comprising a chamber for the cards, means for elevating the rear card and for curving same until its lower end has cleared the card group, and spring belt and roller means for lowering the same into position in front of said card group.

4. A display device for successively and continuously exhibiting a group of display cards or the like, comprising a chamber for the cards, roller and clutch means for elevating the rear card and for curving same until its lower end has cleared the card group, and spring belt and roller means for lowering the same into position in front of said card group.

5. A display device for successively and continuously exhibiting a group of display cards or the like, comprising a casing having a chamber for the cards, a friction roller for elevating the rear card, rollers for receiving the card and for further elevating same, means for receiving and curving said card toward the rear of the casing until the bottom thereof has cleared the rollers and card group, and means for reversing the movement of said card and for lowering the same in front of said group.

6. A display device for successively and continuously exhibiting a group of display cards or the like, comprising a chamber for the cards, a friction roller for elevating the rear card, rollers for receiving the card and for further elevating same and passing the top thereof into clutch means which curves the display until the bottom thereof has cleared the rollers and card group, and means for lowering the same into position in front of said group.

7. A display device for successively and continuously exhibiting a group of display cards or the like, comprising a chamber for the cards, a friction roller for elevating the rear card, rollers for receiving the card and for further elevating same until the bottom thereof has cleared the rollers and card group, and spring belts and rollers for lowering the same into position in front of said group.

8. A display device for successively and continuously exhibiting a group of display cards or the like, comprising a chamber for the cards, a friction roller for elevating the rear card, rollers for receiving the card and for further elevating same and passing the top thereof into clutch means which curves the display until the bottom thereof has cleared the rollers and card group, and spring belts and rollers for lowering the same into position in front of said group.

9. A display device for successively and continuously exhibiting a group of display cards or the like, comprising a chamber for the cards, a friction roller for elevating the rear card, rollers for receiving the card and for further elevating same, a pivoted member having a clutch on the outer end thereof which receives the upper end of said card and propelled by said rollers curves the card until its lower end has cleared the rollers and card group, and means for lowering the card into position in front of the card group.

10. A display device for successively and continuously exhibiting a group of display cards or the like, comprising a chamber for the cards, a friction roller for elevating the rear card, rollers for receiving the card and for further elevating same, a pivoted member having a clutch on the outer end thereof which receives the upper end of said card and propelled by said rollers curves the card until its lower end has cleared the rollers and card group, and spring belts and rollers for lowering the card into position in front of the card group.

11. A display device for successively and continuously exhibiting a group of display cards or the like, comprising a casing having a chamber for the cards, a friction roller for elevating the rear card, rollers for receiving the card and for further elevating same, means for disengaging said friction roller, said rollers continuing to elevate said card, means for receiving and curving said card toward the rear of the casing until the bottom thereof has cleared the rollers and card group, and means for reversing the movement of said card and for lowering the same in front of said group.

12. A display device for successively and continuously exhibiting a group of display cards or the like, comprising a chamber for the cards, a friction roller for elevating the rear card, rollers for receiving the card and for further elevating same, means for disengaging said friction roller, said rollers continuing to elevate said card until the bottom thereof has cleared the rollers and card group, and spring belts and rollers for lowering the same into position in front of said group.

13. A display device for successively and continuously exhibiting a group of display cards or the like, comprising a chamber for the cards, a friction roller for elevating the rear card, rollers for receiving the card and for further elevating same, a pivoted member having a clutch on the outer end thereof which receives the upper end of said card and propelled by said rollers curves the card until its lower end has cleared the rollers and card group, means for closing said clutch upon receipt of said card, means for lowering said card into position in front of the card group, and means for opening the clutch when the pivoted member has been returned to its original position.

14. A display device for successively and continuously exhibiting a group of display cards or the like, comprising a chamber for the cards, a friction roller for elevating the rear card, rollers for receiving the card and for further elevating same, a pivoted member having a clutch on the outer end thereof which receives the upper end of said card and propelled by said rollers curves the card until its lower end has cleared the rollers and card group, means for closing said clutch upon receipt of said card, spring belts for passing the lower end of said card between rollers for lowering said card into position in front of the card group, and means for opening the clutch when the pivoted member has been returned to its original position.

15. A display device for successively and continuously exhibiting a group of display cards or the like, comprising a chamber for the cards, means for elevating the rear card and for curving same until its lower end has cleared the card group, means for lowering the same into position in front of said card group, and automatic snubbing means for preventing the card adjacent the rear card from being elevated therewith.

16. A display device for successively and continuously exhibiting a group of display cards or the like, comprising a chamber for the cards, a friction roller for elevating the rear card, rollers for receiving the card and for further elevating same and passing the top thereof into clutch means which curves the display until the bottom thereof has cleared the rollers and card group, means for lowering the same into position in front of said group, and snubbing means operated by said clutch means for preventing the card adjacent the rear card from being elevated therewith.

17. A display device for successively and continuously exhibiting a group of display cards or the like, comprising a chamber for the cards, means for elevating the rear card and for curving same until its lower end has cleared the card group, rollers having spring belts between same for directing the bottom end of said elevated card downward, the lower one of said rollers having its center line below the tops of the cards in said group whereby the elevated card is assured placement at the front of said group.

18. A display device for successively and continuously exhibiting a group of display cards or the like, comprising a chamber for the cards, roller and clutch means for elevating the rear card and for curving same until its lower end has cleared the card group rollers having spring belts between same for directing the bottom end of said elevated card downward, the lower one of said last named rollers having its center line below the tops of the cards in said group whereby the elevated card is assured placement at the front of said card group.

19. A display device for successively and continuously exhibiting a group of display cards or the like, comprising a casing, a chamber for the cards, means for elevating and curving the rear card of said group until its bottom clears the card group, then reversing the direction of movement to lower the same into position in front of said card group, the space in said casing above said card group being of less height than one-half the card height.

20. A display device having a single chamber for a group of discrete display cards, a transparent panel at the front of said chamber for exhibiting the front card of the group, and means for successively and continuously raising and curving said card, reversing its movement and lowering the same into said chamber at the front of said group.

21. A display device having a single chamber for a group of discrete display cards, a transparent panel at the front of said chamber for exhibiting the front card of the group, and friction and clutch means for successively and continuously raising and curving said card, reversing its movement and lowering the same into said chamber at the front of said group.

22. A display device having a single chamber for a group of discrete display cards, a transparent panel at the front of said chamber for exhibiting the front card of the group, and means for successively and continuously bringing the rear card into said chamber at the front of the group, the height of said device above said card chamber being less than one-half the height of said chamber and cards.

23. A display device having a single chamber for a group of discrete display cards, a transparent panel at the front of said chamber for exhibiting the front card of the group, friction and clutch means for successively and continuously bringing the rear card into said chamber at the front of the group, the height of said device above said card chamber being less than one-half the height of said chamber and cards.

24. A display device for successively and continuously exhibiting a group of display cards or the like, comprising a casing having a chamber for a group of cards, said casing being less than twice the height of said cards, a transparent panel at the front of said chamber for exhibiting the front card therein, means for engaging and elevating the rear card, means for receiving the upper end of said elevated card and curving same to clear the bottom thereof from the card group, and means for guiding said card into position at the front of said group and immediately behind said panel.

25. A display device comprising a casing having a chamber for a group of display cards, a transparent panel at the front of said chamber for exhibiting the front card, said casing being less than twice the height of said cards, means for successively raising the rear card and curving same until it clears the card group, and means for reversing the card movement and depositing said card at the front of said group.

26. A display device for successively and continuously exhibiting a group of display cards or the like comprising a chamber for the cards, means for elevating the rear card and for curving the same until its lower end has cleared the card group, means for engaging same, and means for lowering the same into position in front of said card group.

27. A display device for successively and continuously exhibiting a group of display cards and the like comprising a chamber for the cards, roller and clutch means for elevating the rear cards and for curving same until its lower end has cleared the card group, and means for engaging the same, and means for lowering the same into position in front of said card group.

28. A display device having a single chamber for a group of discrete display cards, a panel at the front of said chamber for exhibiting the front card of the group, and means for successively and continuously raising and curving said card, reversing its movement and lowering the same into said chamber at the front of said group.

29. A display device having a single chamber for a group of discrete display cards, a panel at the front of said chamber for exhibiting the front card of the group, and friction and clutch means for successively and continuously raising and curving said card, reversing its movement, and lowering the same into said chamber at the front of said group.

30. A display device having a single chamber for a group of discrete display cards, a panel at the front of said chamber for exhibiting the front card of the group, and means for successively and continuously displaying the rear card in said chamber at the front of the group, the height of said device above said card chamber being less than one-half the height of said chamber and cards.

31. A display device for successively and continuously exhibiting a group of display cards or the like comprising a casing having a chamber for a group of cards, said casing being less than twice the height of said cards, a panel at the front of said chamber for exhibiting the front card therein, means for engaging and elevating the rear card, means for receiving the upper end of said elevated card and curving same to clear the bottom thereof from the card group, and means for guiding said card into position at the front of said group and immediately behind said panel.

HUMBERT GODOY.